United States Patent
Hursta et al.

(10) Patent No.: US 7,641,110 B2
(45) Date of Patent: Jan. 5, 2010

(54) REAL TIME PREPAID TRANSACTION BIDDING

(75) Inventors: Michael Hursta, Littleton, CO (US); Joel Morrow, Golden, CO (US)

(73) Assignee: First Data Corporation, Greenwood Village, CO (US)

( * ) Notice: Subject to any disclaimer, the term of this patent is extended or adjusted under 35 U.S.C. 154(b) by 462 days.

(21) Appl. No.: 11/258,653

(22) Filed: Oct. 25, 2005

(65) Prior Publication Data

US 2007/0090183 A1    Apr. 26, 2007

(51) Int. Cl.
G06K 5/00    (2006.01)
(52) U.S. Cl. .................. 235/380; 235/379; 235/375; 705/53; 705/78; 705/79
(58) Field of Classification Search .......... 235/380, 235/379, 375, 487; 705/1, 39, 41, 40, 53, 705/75–80
See application file for complete search history.

(56) References Cited

U.S. PATENT DOCUMENTS

| | | | | |
|---|---|---|---|---|
| 2001/0032878 A1* | 10/2001 | Tsiounis et al. | ............ | 235/379 |
| 2002/0184163 A1* | 12/2002 | Lotter et al. | ............ | 705/67 |
| 2003/0200110 A1* | 10/2003 | Munechika et al. | ............ | 705/1 |
| 2003/0218062 A1* | 11/2003 | Noriega et al. | ............ | 235/380 |
| 2004/0078332 A1* | 4/2004 | Ferguson et al. | ............ | 705/41 |
| 2004/0243478 A1* | 12/2004 | Walker et al. | ............ | 705/26 |
| 2005/0028188 A1* | 2/2005 | Latona et al. | ............ | 725/13 |
| 2005/0144030 A1* | 6/2005 | Mazza et al. | ............ | 705/1 |
| 2005/0182707 A1* | 8/2005 | Yeager | ............ | 705/37 |
| 2006/0249570 A1* | 11/2006 | Seifert et al. | ............ | 235/380 |
| 2007/0038560 A1* | 2/2007 | Ansley | ............ | 705/39 |
| 2007/0233603 A1* | 10/2007 | Schmidgall et al. | ............ | 705/51 |
| 2009/0164330 A1* | 6/2009 | Bishop et al. | ............ | 705/19 |

* cited by examiner

Primary Examiner—Edwyn Labaze
(74) Attorney, Agent, or Firm—Townsend and Townsend and Crew LLP (57) ABSTRACT

Electronic transaction networks are described that are operable to find a pathway to complete an electronic data exchange for a prepaid transaction account. The networks may include an intermediary node, in electronic communication with a transaction point node where transaction information is input, and a plurality of processing nodes that can communicate with an account provider node that administers the prepaid transaction account. The intermediary node receives transaction data that may include an account identifier from the transaction point node, and identify one or more of the processing nodes that can form part of the pathway. The pathway may include the transaction point node, the intermediary node, at least one of the processing nodes, and the account provider node. In addition, the intermediary node may find the processing node that forms the pathway for the highest transaction commission when more than one of the processor nodes can form part of the pathway.

24 Claims, 5 Drawing Sheets

REAL TIME PREPAID TRANSACTION BIDDING

BACKGROUND OF THE INVENTION

Prepaid transaction cards have seen increasing popularity as gifts, sales promotion tools, and instruments used by businesses to attract customers and build customer loyalty. These cards may be viewed historically as originating from traditional paper gift certificates offered by retail stores such as toy stores, book stores, records stores, hobby shops, etc., that acted as tender for any good or service sold by the store. Today, however, prepaid transaction cards are being offered by a much wider variety of businesses, some with a very limited retail presence. In addition, new types of prepaid transaction cards are being created for specific classes of goods and services, sometimes making the card look more like prepaid coupon for a particular good or service. Many of these goods and services have limited availability in retail stores.

The evolution of the prepaid transaction card business from its historical roots in the paper gift certificate business presents problems for the distribution of the cards. Traditionally, prepaid transaction cards sold by retailers were affiliated with the businesses of the retailer. For example, the cards sold by a retailer were often focused on products and services sold by the same retailer, in stores owned or affiliated with the retailer. Sales of the cards, and activation of prepaid transaction accounts associated with the cards, were conducted through preconfigured electronic transaction networks that could communicate with point-of-sale devices operating on the store's premises.

Unfortunately, while these transaction networks may be efficient for use with the prepaid transaction cards and accounts created and/or marketed by the retailer, they often don't support cards offered by non-affiliated businesses. This lack of support may extend to sales of the cards themselves, where a customer in one store cannot purchase a prepaid transaction card offered by another business, even when that other business complements, rather than competes with the business of the store. Thus, there is a need for expanding the cooperation of transaction processing systems to allow the purchase and use of prepaid transaction cards in a wider variety of stores and other merchant locations.

The limited cooperation among transaction processing systems and networks for transactions involving prepaid transaction accounts can also increase the costs to process these transactions. When multiple transaction processors are asked to compete for transaction processing services, the effect is almost always to see costs lowered for processing the transaction. Thus, there is a need for new systems and methods of conducting transaction involving prepaid transaction accounts that to try to expand the number of transaction processors competing to complete the transaction. These and other issues are addressed by the present invention.

BRIEF SUMMARY OF THE INVENTION

Embodiments of the invention include electronic transaction networks operable to find a pathway to complete an electronic data exchange for a prepaid transaction account. The networks may include an intermediary node, in electronic communication with a transaction point node where transaction information is input, and a plurality of processing nodes that can communicate with an account provider node that administers the prepaid transaction account. The intermediary node receives transaction data that may include an account identifier from the transaction point node, and identify one or more of the processing nodes that can form part of the pathway. The pathway may include the transaction point node, the intermediary node, at least one of the processing nodes, and the account provider node. In addition, the intermediary node may find the processing node that forms the pathway at a highest transaction commission for the intermediary node when more than one of the processor nodes can form part of the pathway.

Embodiments of the invention also include computer systems for determining a pathway to complete an electronic data exchange for a prepaid transaction account. The systems may include an intermediary node, in electronic communication with a transaction point node and a plurality of processing nodes that can communicate with an account provider node that administers the prepaid transaction account. The intermediary node can poll the plurality of the processing nodes with a message comprising an identity of the account provider node and transaction size data, and receive cost data, including commission data and fee data from the processing nodes. The intermediary node may calculate a transaction commission for each of the processing nodes using the cost data, and may also select the processing node providing the highest transaction commission for inclusion in the pathway. The pathway may include the transaction point node, the intermediary node, the selected processing node, and the account provider node.

Embodiments of the invention may still further include computer networks for fulfilling transaction requirements for assigning a prepaid transaction account to an account user. The networks may include an intermediary node that receives account data associating the account with the user, and a prepaid amount associated with the account, from a transaction point node. The intermediary node may poll processor nodes that can communicate with an account provider node administering the account, and select the processor node that can establish a pathway to fulfill the transaction requirements for a highest transaction commission for the intermediary node. The intermediary node may calculate a fulfillment cost that includes the processor cost and an intermediary cost for fulfilling the transaction requirements.

Embodiments of the invention may also include methods of finding a transaction processor to process a transaction that uses a prepaid transaction account associated with a prepaid transaction card. The methods may include reading an account identifier from the prepaid transaction card, and sending the identifier to a transaction processing intermediary. They may also include identifying, based on the identifier, one or more transaction processors that can process the transaction, and determining the transaction processor that can process the transaction at a highest transaction commission to the intermediary when more than one of the transaction processors can process the transaction.

Embodiments of the invention may still also include methods of selecting a transaction processor for processing a transaction that uses a prepaid transaction account associated with a prepaid transaction card. The methods may include requesting bids from a plurality of the transaction processors, where the request includes identification of a card issuer, and a transaction amount. They may also include receiving from the transaction processors that can process the transaction, processor offers that include a sales commission rate and a fee for processing the transaction, where a processor cost is calculated for each transaction processor that sent an offer. They may further include selecting the transaction processor with the highest transaction commission for the processing of the transaction.

Embodiments of the invention may also further include methods of settling a transaction for the purchase of a prepaid transaction card between a merchant who sold the card and an issuer who issued the card. The methods may include sending to a processing intermediary an account identifier associated with the prepaid transaction card, and a prepaid account balance for the card. They may also include selecting a transaction processor to process the transaction through an auction, where the selected transaction processor bids a lowest processor cost in the auction. They may further include sending a merchant amount from the merchant to the processing intermediary, where the merchant amount is the prepaid account balance minus a merchant commission, and sending a issuer amount from the intermediary to the issuer, wherein the issuer amount is the merchant amount minus the processor cost and an intermediary cost. The intermediary may send the processor cost to the selected transaction processor.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Transaction networks, systems, and methods are described that include an transaction processing intermediary that allows a merchant to process transactions in prepaid transaction accounts from unaffiliated prepaid card issuers (e.g., issuers who do not have a pre-existing business relationship, and/or a predefined transaction processing arrangement with the merchant). The intermediary may form part of a pre-existing transaction network with a point-of-sale system at the merchant site (e.g., a retail store) that is used to process transactions using prepaid transaction cards from card issuers already affiliated with the merchant. When a buyer wishes to purchase a prepaid transaction card from a merchant who is unaffiliated with the card issuer, or to conduct a transaction with the card, the intermediary can use information from the card to find one or more transaction processors that are able to complete the transaction. These transaction processors may or may not be affiliated with the merchant; they just have to be able to complete a transaction between the merchant POS system and the system of the card issuer.

The intermediary may find candidate transaction processors by querying all the transaction processors the intermediary can reach. Those transaction processors capable of completing the transaction may answer the query in the affirmative, and may also send back information about the terms of completing the transaction (e.g., the commission rate and the processor costs). These terms may include variable amounts that are a percentage of the transaction amount (e.g., a sales commission rate) and fix costs that do not depend on the transaction amount (e.g., a transaction processing fee). When more than one transaction processor can complete the transaction, the intermediary may pick the processor offering the most favorable terms, (e.g., the highest commission rate and lowest processor cost).

The transaction processing intermediary allows the merchant to sell prepaid transaction cards and conduct transactions with prepaid transaction cards that have been issued by both affiliated and unaffiliated card issuers. This benefits merchants by allowing them to offer and accept a larger number of prepaid transaction cards from customers. The increased sales of unaffiliated cards results in increased commission revenue for the merchants, and the increased card offerings can attract new customers to stores, websites, and other merchant sales locations. The card issuers also benefit from having a larger number of sales outlets at which they can sell their prepaid transaction cards. The industry as a whole benefits as well, because the expansion of prepaid card offerings can be implemented without the added costs of creating a lot of new transaction processing infrastructure dedicated to processing transactions between specific merchants and prepaid card issuers. Thus, the present invention facilitates and increase in consumer choice and convenience in the prepaid transaction card industry without a significant increase in cost.

Figure 1:
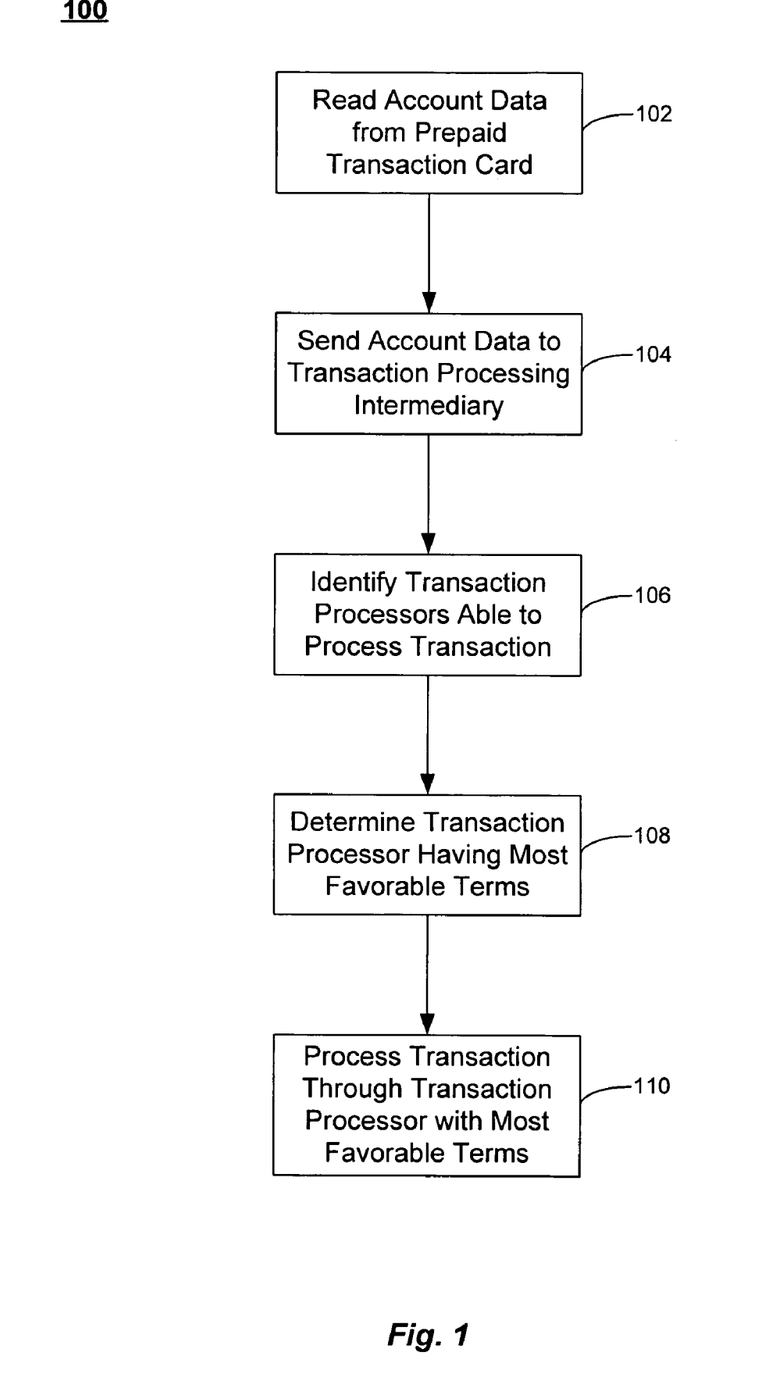
FIG. 1 is a flowchart showing steps in methods of establishing a transaction mechanism for prepaid transaction accounts according to embodiments of the invention.

Referring now to FIG. 1, a flowchart showing steps an embodiment of a method 100 of establishing a transaction mechanism for prepaid transaction accounts is shown. The method 100 includes the step of reading account data from a prepaid transaction card 102. The data from the card may be read by a system located at the point of sale that includes a card reading device. This data may include a bank identification number (BIN), or some other identifier of the network, card issuer, and/or administrator of the associated transaction account, as well as data to identify the particular prepaid transaction account. Embodiments may include software and/or logic in a point-of-sale system for identifying the card network/issuer/administrator for prepaid transaction card that do not have a conventional identifier like a BIN. For example, the POS system may include optical recognition of indicia on the card that is translated into a network/issuer/administrator code and associated with the received data identifying the particular account. The POS system may also have equipment to read a magnetic strip and/or radio frequency identification chip (i.e., an RFID tag) that can read information from the card corresponding to the issuer code. The system may also have the ability to search a table of account numbers for prepaid transaction cards distributed by the merchant that associates individual prepaid transaction account numbers with the network/issuer/administrator that issued the card. This data may be sent by the POS system with other account data to a transaction processing intermediary 104.

The account data may provide the identity of the card issuer and/or account administrator, and may also include an account identifier that uniquely identifies the transaction account (e.g., an account number). The account data may also include a transaction amount for the transaction. The account data may be sent from to a transaction processing intermediary 104 in communication with the point-of-sale system and processed by the intermediary to determine the requirements for completing the transaction. For example, the intermediary may use the account data to ascertain the merchant point-of-sale system and prepaid card issuer and/or card administrator system that have to cooperate in order to complete the transaction.

After receiving the account data, the processing intermediary can identify the transaction processors that are able to process the transaction 106. Embodiments include identifying the transaction processors by accessing a database that includes data on the compatibility of listed transaction processors with the systems of specific prepaid card issuers and/or prepaid account administrators. The processing intermediary may send a query to the database and receive back response data that includes the identity of one or more transaction processors that are able to complete the transaction.

Embodiments also include the processing intermediary polling transaction processors to determine if they are able to process the transaction. The polling may involve sending an electronic message to each of the transaction processors in communication with the processing intermediary, where the message may include the identity of the prepaid card issuer and/or prepaid account administrator that is involved in the transaction. The transaction intermediary may receive responses to identify candidate transaction processors.

When more than one transaction processor is identified as able to process the transaction, a determination may be made of which transaction processor can complete the transaction on the most favorable terms for the merchant and/or processing intermediary 108. For example, the response data received from the database query for compatible transaction processors may include sales commission and processor cost data that can be used to determine the transaction terms from each processor to complete the transaction. This cost data may include one or more cost components, such as relative costs that depend on the amount of the transaction (e.g., a percent commission charged by the transaction processor) and/or fixed costs that do not depend on the transaction amount (e.g., a flat processing fee charged by the transaction processor for completing the transaction).

Embodiments include allowing transaction processors access to the database to update information about prepaid card issuer and/or prepaid account administrator systems with which they are compatible, and also to update their processor cost information, among other information. Transaction processors may or may not have access to compatibility information, sales commission information, processor cost information, etc. of other transaction processors. Embodiments include giving individual transaction processors the ability to affirmatively limit database access to some or all of their information by other transaction processors.

The determination of the transaction processor having the most favorable terms 108 may also be based on commission and cost data received in the responses of the transaction processors to the polling done by the processing intermediary. Embodiments include the ability to make commission and cost data more dynamic by allowing the transaction processors to provide updated data in response to the cost data provided by competing transaction processors. This may be done through an auction process where compatible transaction processors can make multiple bids to be selected to complete the transaction.

When the transaction processor with most favorable terms has been selected, the transaction may be processed through that processor 110. The transaction path formed by method 100 may include a point-of-sale segment where the prepaid transaction account information is collected, a transaction intermediary segment, a transaction processor segment, and a card issuer and/or prepaid account administrator segment. In other embodiments, the processor intermediary may not be a segment of the transaction path, but instead coordinate the communication of the point-of-sale system (e.g., the merchant system) with the transaction processor. Embodiments may also include the transaction processor and the card issuer and/or prepaid account administrator being the same entity, allowing the transaction processor and card issuer and/or prepaid account administrator segments to be consolidated into one segment of the path.

Figure 2:
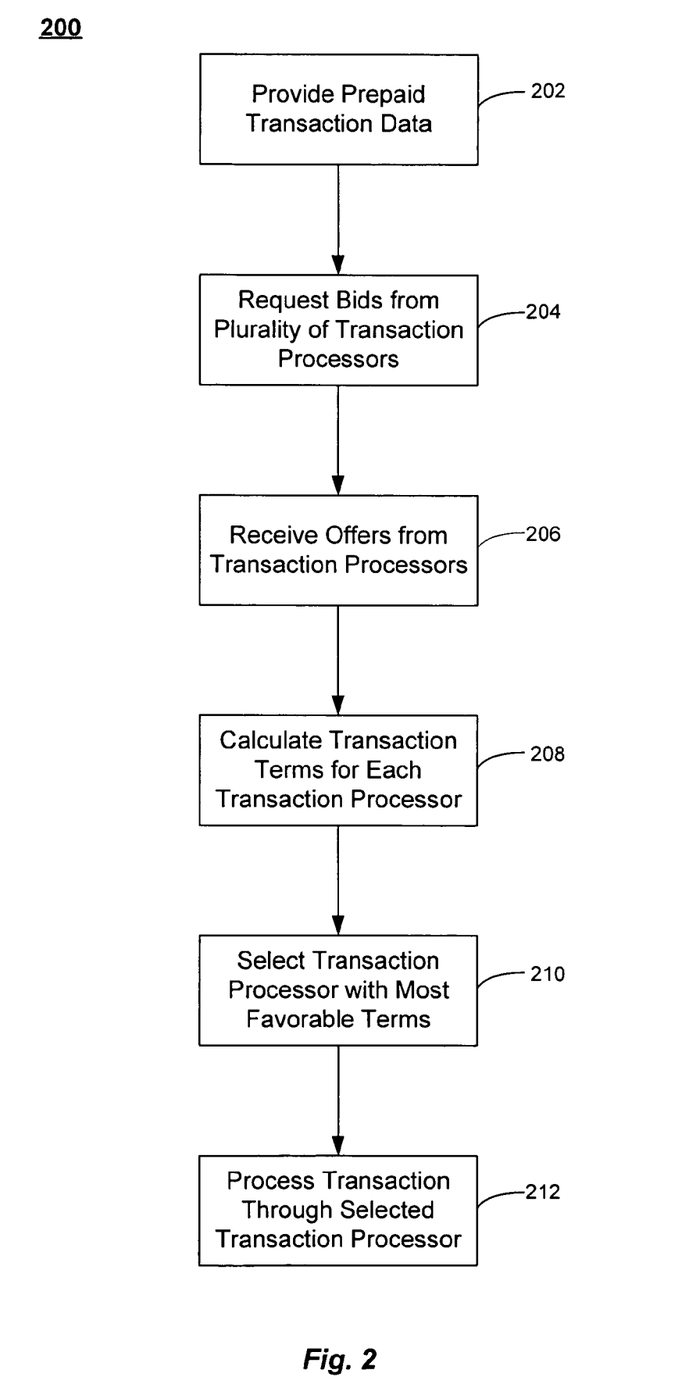
FIG. 2 is a flowchart showing steps in selecting transaction processors to perform transactions in prepaid transaction accounts according to embodiments of the invention.

FIG. 2 shows steps involved in a method 200 for selecting transaction processors to perform transactions in prepaid transaction accounts according to embodiments of the invention. The method 200 includes providing prepaid transaction data 202, which may include prepaid transaction account information and a transaction amount. For example, when a customer is purchasing a prepaid transaction card at a merchant's store, the prepaid transaction data provided by the merchant may include account activation information (e.g., an account number associated with the prepaid transaction card) and the purchase price of the card (e.g., the face value listed on the card, or a discounted price less than the face value). In another example, a prepaid card user may be redeeming value from the card to make a purchase from the merchant. The prepaid transaction data may include data identifying the card issuer/administrator, and data to uniquely identify the prepaid transaction account (e.g., an account number), as well as data including the transaction amount involved in the redemption.

The prepaid transaction data may be used to request bids from a plurality of transaction processors 204. The bid request may involve sending a message to each transaction processor with information about the account issuer/administrator and the transaction amount. Embodiments include classifying transaction processors into different groups, and targeting the bid request message to less than all the groups. For example, the transaction processors may be classified into two groups according to predefined criteria (e.g., whether the merchant as satisfied a minimum usage rate requirement for the transaction processor). The bid request message may be sent to only one of the two groups (e.g., the group of transaction processors where the merchant has not satisfied a minimum usage rate requirement).

Embodiments also include posting the bid request in an auction format, and allowing the transaction processors (e.g., through biding agents, bots, etc.) to bid for the right to process the transaction. The auction format used may include a sealed bid auction, an English auction, and a Dutch auction, among other types of auctions.

The offers (e.g., bids) are received from the transaction processors 206, and the offer information may be used to calculate the process cost for each transaction processor making an offer 208. The offer information may include one or more cost components, including a percentage sales commission and a fixed fee that can be used to calculate the terms for completing the transaction. For example, three transaction processors may submit offers to process the transaction, where each processor submits the same sales commission rate of 6% of the transaction amount, but have different flat processing fees (e.g., $0.05, $0.07, and $0.08).

If the transaction amount is, for example, $50, then the sales commission is $3, which may be divided by a pre-existing agreement between the transaction intermediary and the merchant (e.g., a 70/30 split where the merchant keeps 70% of the sales commission and the intermediary keeps 30% minus the processing costs charged by the transaction processor). In this case, from the perspective of the transaction intermediary the most favorable terms are offered by the transaction processor having the lowest processor costs. The transaction processor offering the 6% sales commission and $0.05 processing fee allows the intermediary to keep $0.85 of the commission (i.e., 30% of a $3 commission minus the $0.05 processing fee), while the intermediary keeps $0.83 and $0.82 when the transaction processors charging processing fees of $0.07 and $0.08, respectively, are used.

When the terms of the transaction processors have been calculated 208, the processor with the most favorable terms for the merchant and/or transaction intermediary may be selected 210, and the transaction processed through the selected transaction processor 212. As noted above, the selected transaction processor may form part of a transaction path that also include the merchant system (e.g., the POS system), the processing intermediary, and the card issuer and/or prepaid account administrator system.

Figure 3:
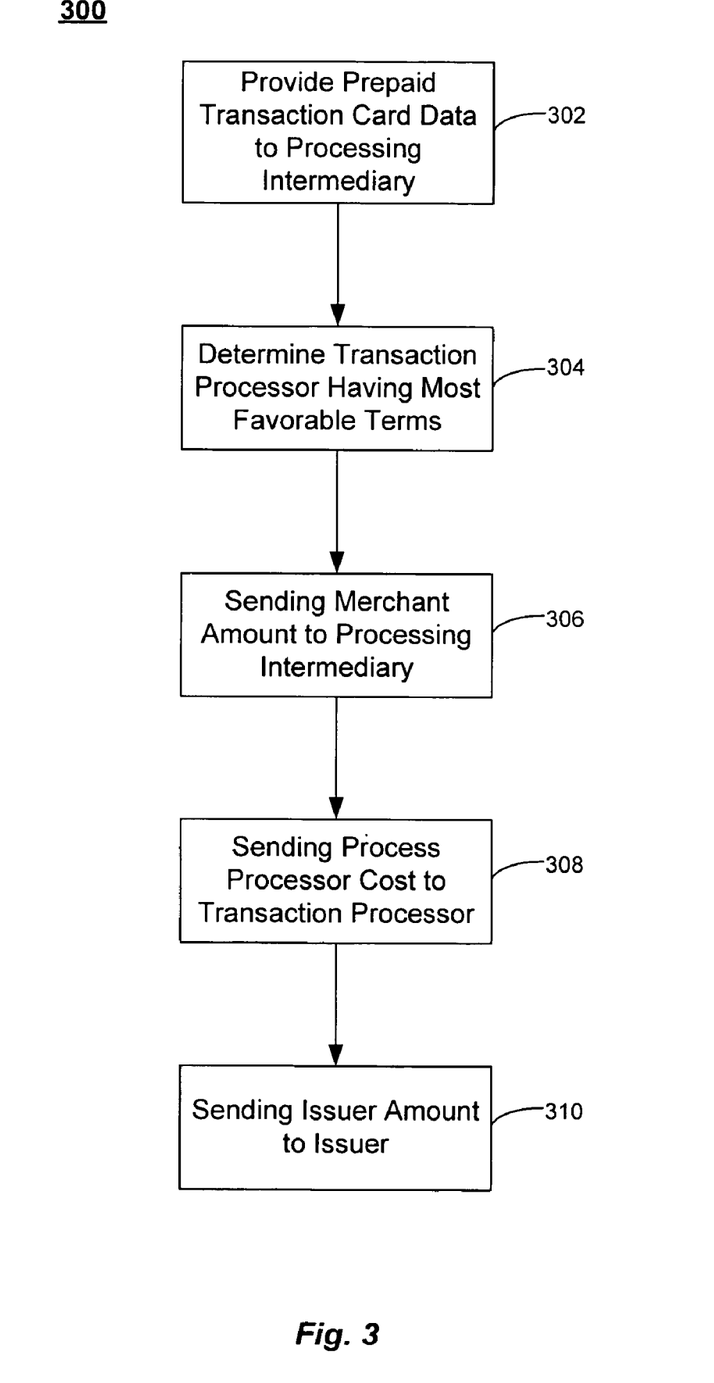
FIG. 3 is a flowchart showing steps in executing a final settlement for the purchase of a prepaid transaction card according to embodiments of the invention.

Referring now to FIG. 3, a method 300 showing steps in executing a final settlement for the purchase of a prepaid transaction card according to embodiments of the invention is shown. The method 300 includes providing prepaid transaction card data to a processing intermediary 302. This data may include account activation information (e.g., an account number associated with the prepaid transaction card) and the purchase price of the card (e.g., the face value listed on the card). The intermediary may then identify transaction processor able to complete the transaction to purchase the card, and determine which processor has the most favorable terms for the merchant and/or intermediary for completing the transaction 304. When the processor is selected, the intermediary may determine the settlement amounts due to each participant in the transaction. This may involve the merchant sending a merchant amount to the processing intermediary 306 (i.e., the sales amount minus the percentage of the sale commission that belongs to the merchant). It may also involve sending the processor costs to the transaction processor 308, and sending the card issuer/administrator an issuer amount 310 (i.e., the sales amount minus the sales commission). The intermediary may earn the funds received by the merchant and not sent to the other transaction participants.

The final settlement process may be conducted so that no portion of the funds have to make a round trip from and to the same transaction participant. For example, the merchant may send the transaction intermediary the merchant amount (i.e., the sales amount minus the percentage of the sale commission that belongs to the merchant) instead of the entire sales amount, some of which would make a round trip back to the merchant as the merchant portion of the sales commission. Similarly, the processing intermediary holds back its portion of the sales commission when forwarding the processing fee and issuer amount to the transaction processor.

As an example, if the purchaser is buying a $100 prepaid transaction card from the merchant for face value, the intermediary can direct the flow of funds to each participant for the final settlement. If the intermediary selects a transaction processor who offers a 10% sales commission and charges a $0.25 processing fee, the processor can calculate that the issuer will receive $90 (i.e., $100 minus the 10% sales commission), the merchant will receive $7 (e.g. 70% of the 10% sales commission), the intermediary will receive $2.25 (e.g., 30% of the 10% sales commission-$0.25 processing fee), and the transaction processor will receive $0.25. In the final settlement, this can be done by having the merchant forward $93 of the $100 received from the prepaid transaction card purchaser to the processing intermediary. The intermediary then forwards $90.25 of the $93 to the transaction processor, which forwards the $90 owed to the card issuer/administrator.

Figure 4:
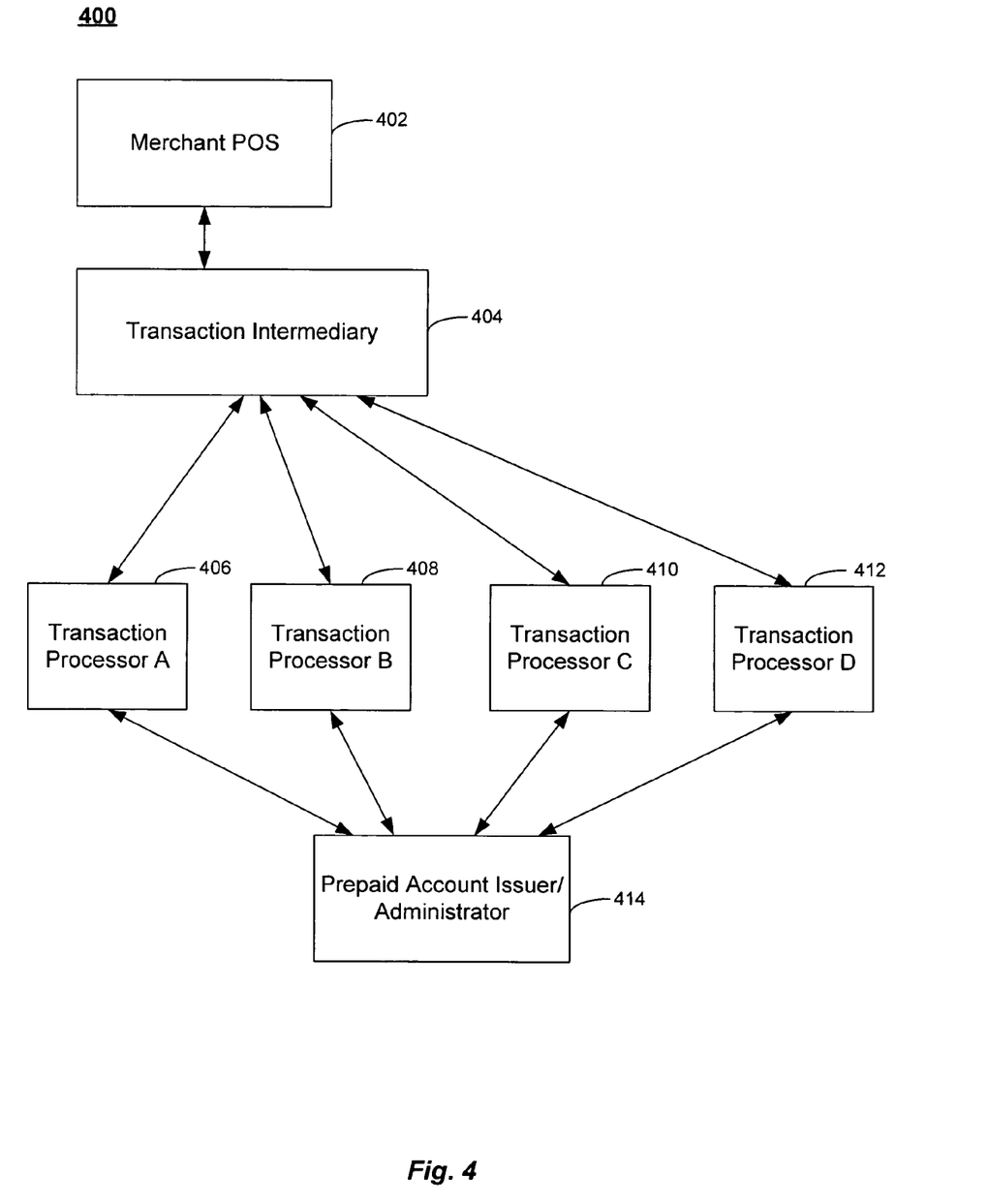
FIG. 4 is a schematic of an electronic transaction network that may be used for transactions in a prepaid transaction account according to embodiments of the invention.

FIG. 4 shows a schematic of an electronic transaction network 400 that may be used for transactions in a prepaid transaction account according to embodiments of the invention. Network 400 may include a point-of-sale system 402 that can read prepaid transaction account information from a prepaid transaction card presented by a card purchaser or user. The point-of-sale system 402 may include a device to read information from a magnetic stripe, computer chip, barcode, etc., attached to the prepaid transaction card.

Data about a transaction involving a prepaid transaction account input into the point-of-sale system 402 may be received by the transaction intermediary 404. The transaction intermediary 404 may include prepaid transaction processors that have a pre-existing payment processing relationship with the merchant operating the POS system 402. For example, the transaction intermediary 404 may perform payment processing for a portfolio of prepaid transaction account issuers have a formal relationship (e.g., a supply agreement, an authorized seller agreement, etc.) with the merchant. The transaction intermediary 404 may continue to process transactions involving this portfolio according to predefined procedures using pre-designated transaction processors, or may select a new transaction processor.

The transaction intermediary 404 may process the transaction data, and communicate with a group of transaction processors A, B, C, and D 406-412 respectively, to determine which transaction processor 406-412 will process the transaction. In the embodiment shown in FIG. 4, all four transaction processors 406-412 are able to communicate with the prepaid transaction account issuer/administrator 414, and form a transaction pathway between the POS system 402 and the issuer/administrator 414. Transaction intermediary 404 may select one of the transaction processors 406-412 based on which of the processors 406-412 can process the transaction to realize the highest transaction commission for the transaction intermediary 404. For example, the transaction intermediary 404 may request bids from each of the processors 406-412 that include a bid for a sales commission (e.g., a percentage of the transaction amount) and a flat processor fee charged by the processor. The transaction intermediary 404 may calculate the transaction commission offered by each processor 406-412, and choose the processor (e.g., transaction processor B 408) offering the highest transaction commission.

When a transaction processor 406-412 is selected, a transaction pathway may be formed between the POS system 402, the transaction intermediary 404, the transaction processor (e.g., transaction processor B 408) and the prepaid account issuer/administrator 414. This pathway may be used verify that a prepaid transaction account is active and that sufficient prepaid funds are available to complete the transaction. The pathway may also be involved in distributing a net settlement of funds between the participants in the transaction. For example, if the transaction pathway is being used for the purchase of a prepaid transaction card itself (e.g., a $100 prepaid transaction card), the transaction pathway may be used to credit the merchant POS system 402 with a sales commission (e.g., a merchant amount), the transaction intermediary 404 with a transaction commission, the transaction processor 408 with a processor fee, and the issuer/processor with the sale price of the card minus the fees and commissions (e.g., an issuer amount).

The network 400 may be described as a series of interconnected nodes that are used to form a transaction pathway to complete a transaction involving a prepaid transaction account. The transaction intermediary 404 may be described as an intermediary node capable of communicating electronically with both a transaction point node (e.g., an element of the POS system 402) and one or more processor nodes (e.g., transaction processors A, B, C, and D 406-412), which may communicate with an account provider node (e.g., the prepaid transaction account issuer/administrator 414). The transaction pathway may include all four nodes (i.e., the transaction point node, the intermediary node, the processor node, and the account provider node), or some other combination of nodes, such as the transaction point node, the processor node, and the account provider node.

Figure 5:
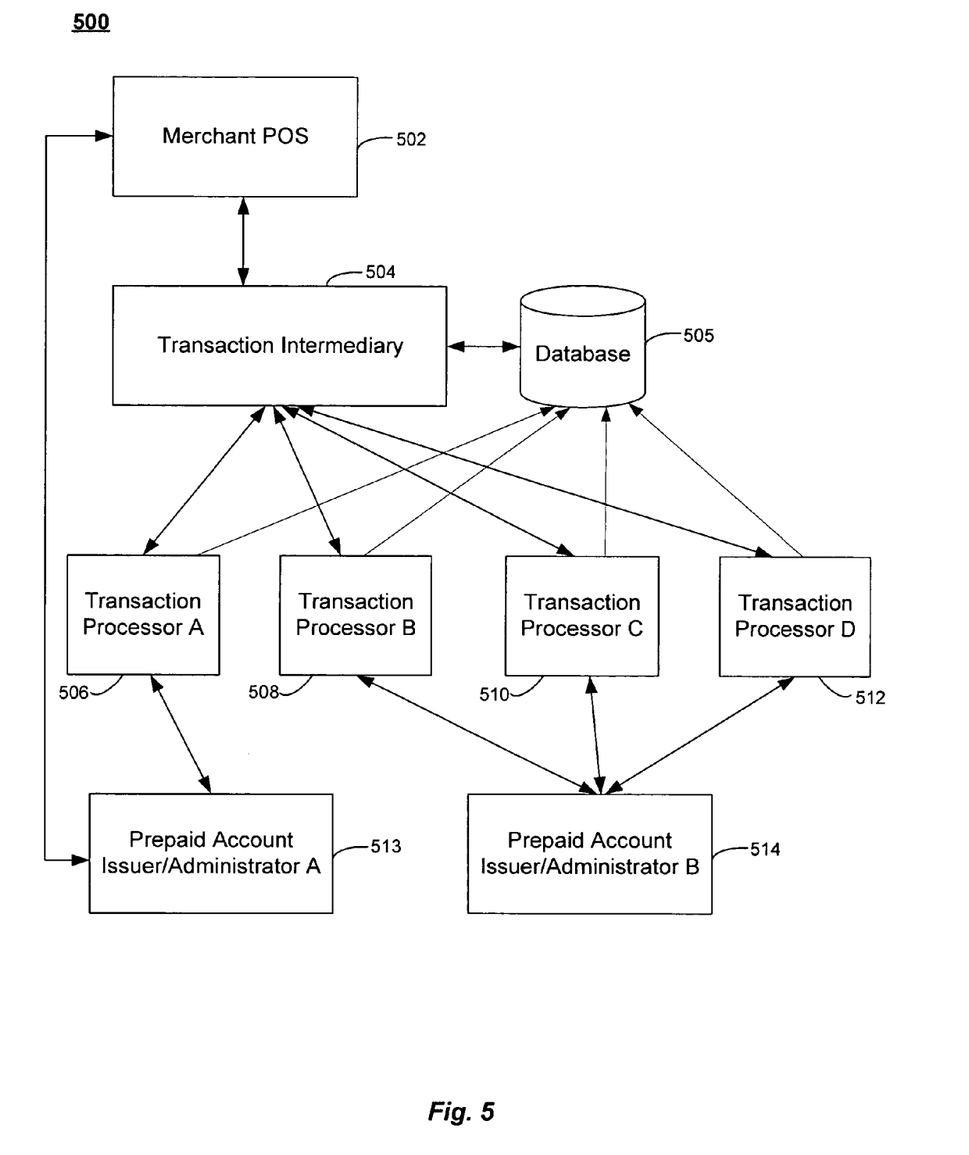
FIG. 5 is another schematic of a computer system that may be used for transaction in a prepaid transaction account according to embodiments of the invention.

Referring now to FIG. 5, a schematic of a computer network 500 that may be used for transactions in a prepaid transaction account according to embodiments of the invention is shown. The network 500 may include a point-of-sale (POS) system 502 in communication with a transaction intermediary 504, and capable of providing transaction data about a transaction being conducted at system 502. The transaction intermediary 504 may be in electronic communication with a database 505 that may contain data on the compatibility of listed transaction processors 506-512 with the systems of specific prepaid card issuers and/or prepaid account administrators 513 and 514.

In network 500, the transaction processors 506-512 may access to the database 505 to update information about prepaid card issuer and/or prepaid account administrator systems with which they are compatible, and also to update their processor cost information, among other information. Transaction processors 506-512 may or may not have access to compatibility information, sales commission information, processor cost information, etc. of other transaction processors in the database 505. Embodiments include making the transaction intermediary 504 the administrator of database 505, and controlling access of individual transaction processors 506-512 to information of other transaction processors. Each of the transaction processors 506-512 may instruct the transaction intermediary 504 to affirmatively limit database access to some or all of their information by other transaction processors.

The processing intermediary 504 may send a query to the database 505 and receive back response data that includes the identity of one or more transaction processors 506-512 that are able to complete the transaction. The response data received from a query of database 505 may also include sales commission and processor cost data that can be used to determine the transaction terms from each processor 506-512 to complete the transaction. This cost data may include one or more cost components, such as relative costs that depend on the amount of the transaction (e.g., a percent commission charged by the transaction processor) and/or fixed costs that do not depend on the transaction amount (e.g., a flat processing fee charged by the transaction processor for completing the transaction).

For example, the transaction intermediary 504 may receive transaction data about a transaction being conducted at the POS system 502 where a buyer wishes to use a prepaid transaction card issued by prepaid account issuer/administrator A 513. The transaction intermediary 504 may process the transaction data and send a first query to the database 505 which responds with information that only transaction processor A 506 can process transactions for account issuer/administrator A 513. In this case, the transaction intermediary 504 forms a transaction pathway between the POS system 502, transaction intermediary 504, transaction processor A 506, and prepaid account issuer/administrator A 513, without asking for the transaction processors 506-512 to bid for the right to process the transaction.

The database 505 may also store auction data that describes how each transaction processor 506-512 will respond if the processing intermediary 504 holds an auction for the right to process a transaction. The auction data may include a maximum sales commission and/or minimum processing fee the transaction processor will bid for the transaction. The data may also include an increment for raising a sales commission bid or lowering a processing fee in response to being outbid by a competing transaction processor. The processing intermediary 504 may download the auction data from the database 505 for the transaction processors using an automated bidding agent to participate in an electronic auction.

The POS system 502 may send transaction data about a second transaction to the transaction intermediary 504, where this transaction involves a second prepaid transaction card issued by prepaid account issuer/administrator B 514. The database 505 responds to a query about this account issuer/administrator B 514 with the identity of three transaction processors B, C, and D 508-512 able to process the transaction. The database may also send cost data listed for each of the processors 508-512 that allows the transaction intermediary 504 to determine which of the processors can realize the highest transaction commission for the merchant and/or intermediary. Base on this determination, the transaction intermediary 504 may then form a transaction pathway between the POS system 502 and the prepaid account issuer/administrator B 514.

Embodiments also include having network 500 permit transactions to be conducted directly between the POS system 502 and a prepaid account issuer/administrator A 513. This direct connection may bypass the transaction intermediary 504 and the transaction processors 506-512, forming a pathway between just the POS system 502 and prepaid account issuer/administrator A 513 to complete the transaction. With this configuration, network 500 may process both these direct transactions, and transactions that involve the transaction intermediary 504 and/or transaction processors 506-512.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A electronic transaction network operable to find a pathway to complete an electronic data exchange for a prepaid transaction account, the network comprising:
   an intermediary node, in electronic communication with a transaction point node where transaction information is input, and a plurality of processing nodes that can communicate with an account provider node that administers the prepaid transaction account,
   wherein the intermediary node receives transaction data comprising an account identifier from the transaction point node, and identifies one or more of the processing nodes that can form part of the pathway, where said pathway comprises the transaction point node, the intermediary node, at least one of the processing nodes, and the account provider node, and
   wherein the intermediary node finds the processing node that forms the pathway at a highest transaction commission when more than one of the processor nodes can form part of the pathway.

2. The electronic transaction network of claim 1, wherein the finding of the processing node that forms the pathway at a highest transaction commission for the intermediary node comprises receiving from each of the processing nodes a bid comprising a sales commission and a processor fee to form the pathway, and calculating the transaction commission by multiplying the sales commission by a prepaid transaction amount for the transaction account to determine a relative amount, and subtracting the relative amount to the fixed amount to determine the transaction commission.

3. The electronic transaction network of claim 1, wherein the identification of the one or more processor nodes that can form part of the pathway comprises the intermediary node polling the plurality of processor nodes to determine whether they form at least part of the pathway to the account provider node.

4. The electronic transaction network of claim 1, wherein the intermediary node accesses a database with information about the plurality of processor nodes to identify the one or more processing nodes that can form part of the pathway.

5. A computer system for determining a pathway to complete an electronic data exchange for a prepaid transaction account, the system comprising:
   an intermediary node, in electronic communication with a transaction point node and a plurality of processing nodes that can communicate with an account provider node that administers the prepaid transaction account;
   wherein the intermediary node polls the plurality of the processing nodes with a message comprising an identity of the account provider node and transaction size data, and
   wherein the intermediary node receives cost data comprising commission data and fee data from the processing nodes, and calculates a processing cost for each of the processing nodes using the cost data, and
   wherein the intermediary node selects the processing node having a highest transaction commission for inclusion in the pathway comprising the transaction point node, the intermediary node, the selected processing node, and the account provider node.

6. The computer system of claim 5, wherein determining the highest transaction commission comprises identifying a commission rate for each of the processing nodes and multiplying the commission rate by a transaction amount from the transaction size data to calculate a commission amount, and subtracting the commission amount from a processor fee from the fee data to calculate the transaction commission.

7. The computer system of claim 5, wherein the plurality of processing nodes comprises a second group of processing nodes that is separate from a first group of processing nodes that is not considered by the intermediary node for inclusion in the pathway.

8. The method of claim 7, wherein the processing nodes are grouped into the first and second group of processing nodes by determining if a minimum number of transaction requirement has been satisfied for each of the processing nodes, and grouping the processing nodes that have met the requirement in the first group, and grouping the processing nodes that have not met the requirement in the second group.

9. A computer network for fulfilling transaction requirements for assigning a prepaid transaction account to an account user, the network comprising:
   an intermediary node that receives account data associating the account with the user, and a prepaid amount associated with the account, from a transaction point node;
   wherein the intermediary node polls processor nodes that can communicate with an account provider node administering the account, and selects the processor node that can establish a pathway to fulfill the transaction requirements for a highest transaction commission for the intermediary node, and
   wherein the intermediary node calculates a fulfillment cost comprising the processor cost and an intermediary cost for fulfilling the transaction requirements.

10. The computer network of claim 9, wherein the intermediary node sends fulfillment data to the transaction point node comprising a settlement amount, and wherein said settlement amount is the prepaid amount minus a merchant commission.

11. The computer network of claim 10, wherein the intermediary node calculates an account provider amount by subtracting the fulfillment cost from the settlement about and sends the account provider amount to the account provider node.

12. The computer network of claim 11, wherein the intermediary node sends the processor cost to the selected processor node after receiving the settlement amount from the transaction point node.

13. A method of finding a transaction processor to process a transaction that uses a prepaid transaction account associated with a prepaid transaction card, the method comprising:
   reading an account identifier from the prepaid transaction card, and sending the identifier to a transaction processing intermediary;
   identifying, based on the identifier, one or more transaction processors that can process the transaction; and
   determining the transaction processor that can process the transaction at a highest transaction commission to the intermediary when more than one of the transaction processors can process the transaction.

14. The method of claim 13, wherein the step of determining the transaction processor that can process the transaction at the highest transaction commission to the intermediary comprises:
   receiving from each transaction processor a sales commission rate and a processing fee for completing the transaction; and determining the cost of the transaction for each transaction processor, wherein the cost determination comprises multiplying the sales commission rate by a transaction amount to determine a commission amount, and subtracting the commission amount from the processing fee.

15. The method of claim 13, wherein the method comprises polling an plurality of the transaction processors to determine whether they can process the transaction.

16. The method of claim 13, wherein the identifying of the transaction processors comprises searching a database comprising information about transaction processors and identifying the transaction processors listed in the database that are able to process the transaction.

17. A method of selecting a transaction processor for processing a transaction that uses a prepaid transaction account associated with a prepaid transaction card, the method comprising:
   requesting bids from a plurality of the transaction processors, wherein the request includes identification of a card issuer, and a transaction amount;
   receiving from the transaction processors that can process the transaction, processor offers comprising a sale commission rate and a fee for processing the transaction, wherein a processor cost is calculated for each transaction processor that sent an offer; and
   selecting the transaction processor with a highest processing commission to the processing of the transaction.

18. The method of claim 17, wherein the calculation of the processing commission comprises multiplying the sales commission rate by the transaction amount to determine a commission amount, and subtracting the commission amount from the fee for processing the transaction.

19. The method of claim 17, wherein the method comprises sorting the plurality of transaction processors into a first group of transaction processors and a second group of transaction processors, and wherein the plurality of transaction processors from which the bids are requested is the second group of transaction processors.

20. The method of claim 19, wherein the sorting of the plurality of transaction processors comprises:
   determining if a minimum number of transactions requirement has been satisfied for each of the transaction processors; and
   identifying the transaction processors that have met the requirement with the first group of transaction processors, and identifying the transaction processors that have not met the requirement with the second group of transaction processors.

21. A method of settling a transaction for the purchase of a prepaid transaction card between a merchant who sold the card and an issuer who issued the card, the method comprising:
   sending to a processing intermediary an account identifier associated with the prepaid transaction card, and a prepaid account balance for the card;
   selecting a transaction processor to process the transaction through an auction, wherein the selected transaction processor bids a highest transaction commission in the auction;
   sending a merchant amount from the merchant to the processing intermediary, wherein the merchant amount is the prepaid account balance minus a merchant commission; and
   sending a issuer amount from the intermediary to the issuer, wherein the issuer amount is the merchant amount minus the processor cost and an intermediary cost, and wherein the intermediary sends the processor cost to the selected transaction processor.

22. The method of claim 21, wherein the issuer amount is a fixed percentage of the prepaid account balance.

23. The method of claim 21, wherein the merchant commission is a fixed percentage of the prepaid account balance.

24. The method of claim 21, wherein the auction for the selecting of the selected transaction processor comprises a sealed auction, a Dutch auction, or an English auction.

* * * * *

UNITED STATES PATENT AND TRADEMARK OFFICE
CERTIFICATE OF CORRECTION

PATENT NO.       : 7,641,110 B2                                    Page 1 of 1
APPLICATION NO. : 11/258653
DATED            : January 5, 2010
INVENTOR(S)      : Hursta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Sixteenth Day of November, 2010

David J. Kappos
*Director of the United States Patent and Trademark Office*